United States Patent
Glackin

[11] 3,762,305
[45] Oct. 2, 1973

[54] SANDWICH MAKING MACHINES
[75] Inventor: Charles Glackin, Glasgow, Scotland
[73] Assignee: United Biscuits Limited, Isleworth, Middlesex, England
[22] Filed: July 13, 1971
[21] Appl. No.: 162,062

[52] U.S. Cl. .............................. 99/450.4, 99/450.7
[51] Int. Cl. ........................ A21c 15/02, A21c 9/06
[58] Field of Search ...................... 99/450.4, 450.5, 99/450.7, 404, 409

[56] References Cited
UNITED STATES PATENTS

| | | | |
|---|---|---|---|
| 2,817,306 | 12/1957 | Oakes | 99/450.4 |
| 2,853,961 | 9/1958 | Oakes | 99/450.4 |
| 2,910,017 | 10/1959 | Oakes | 99/450.4 |
| 3,343,504 | 9/1967 | Belk | 99/450.4 |
| 3,348,503 | 10/1967 | Belk | 99/450.4 |
| 2,679,811 | 6/1954 | Knee | 99/450.7 |
| 2,868,141 | 1/1959 | Griner | 99/450.4 |
| 3,410,198 | 12/1968 | Lohr et al. | 99/443 R |

Primary Examiner—John Petrakes
Assistant Examiner—Alan I. Cantor
Attorney—Howard H. Darbo et al.

[57] ABSTRACT

Sandwich making machines in which baked dough pieces are conveyed continuously by spaced pusher fingers past a coating station which coats alternate pieces; past an automatic gate which removes each uncoated biscuit from its pusher finger so that the succeeding coated biscuit then pushes the uncoated biscuit along in front of it; and past a swingable hook which turns over the uncoated pieces about the front end of the succeeding coated piece as a fulcrum so that the coated piece drops onto the succeeding coated piece to form a sandwich.

3 Claims, 29 Drawing Figures

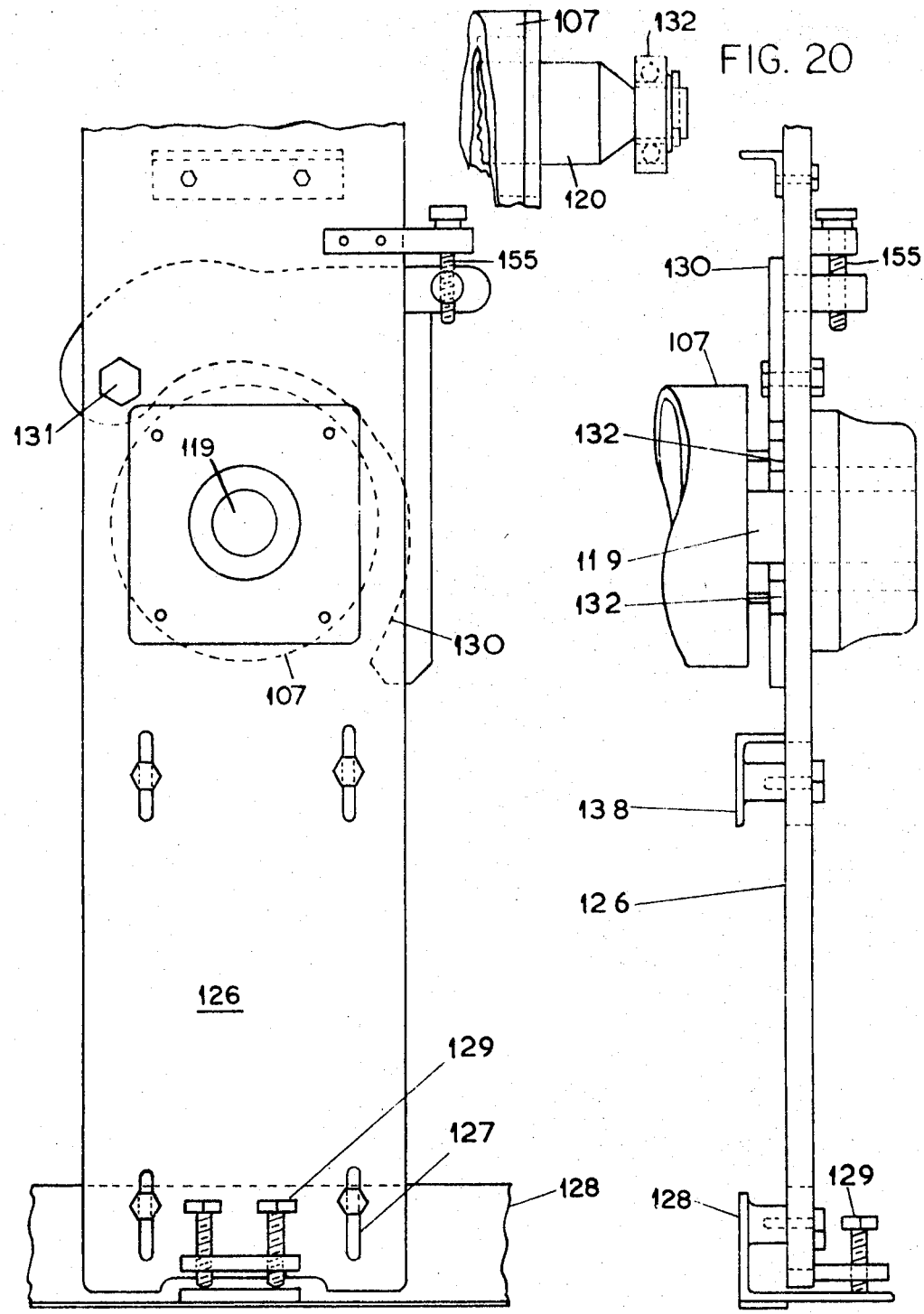

3,762,305

SANDWICH MAKING MACHINES

BACKGROUND OF THE INVENTION

In order to form sandwich biscuits from a spaced succession of like individual unsymmetrical biscuits passing along a conveyor from a single common supply all in the same aspect, filling is applied to alternate biscuits only. As described the intervening uncoated biscuits are turned over and deposited on the coated biscuits.

Each uncoated biscuit is slowed down beyond the filling position so as to contact the succeeding filled biscuit. Thereafter the leading edge of the uncoated biscuit is caught by a swinging hook which raises the biscuit about its trailing edge (in contact with the succeeding biscuit) until the tipped biscuit passes the vertical and drops on to the succeeding filled biscuit on which it is squared up and compressed to size by static guides.

Special arrangements for feeding biscuits from a stack to a conveyor, and a preferred form of filling - pat forming and depositing equipment are described.

SUMMARY OF THE INVENTION

This invention relates to sandwich making machines.

Sandwich making machines are known in which sandwich pieces are transferred from a first stack onto a conveyor which initially leads them under a device for applying a coating and then under a second stack from which a piece is deposited onto each coated piece in turn.

British Specifications Nos. 1,071,361 and 1,082,737 in the name of Werner Bahlsen describe sandwich making machines in which pieces are transported in single file by a continuous conveyor on which alternate pieces are coated and the intervening uncoated pieces are picked up by suction and placed on a succeeding coated piece.

When the surfaces of the individual pieces are different, the need to arrange the two stacks differently demands special manipulation between the baking oven and the stacks.

The object of the present application is to obviate the above operation so that the pieces can be conveyed from the oven conveyor direct to the sandwich making machine.

According to the present invention mechanical handling means are provided in the machine for bringing together the inside coated and uncoated surfaces of two pieces to form a sandwich,

DESIGNATION OF THE FIGURES

FIGS. 1A and 1B, which should be placed side by side, show a schematic perspective layout of a biscuit cream sandwich machine, FIG. 2 is a cross-sectional elevation of the creaming device, FIGS. 3, 4, 5 and 6 show successive stages in the operation of a sandwiching flip finger, FIGS. 7-16 show the incorrect and the correct ways of feeding biscuit layers onto the conveyor guide rail or biscuit support when using carrier or pusher lugs, FIG. 17 shows in side elevation partly in section the mold barrel and the cream hopper, FIGS. 18 and 19 show in end and partial front elevation respectively the arrangemment of the mold barrel, cream pat ejectors, and cams on the machine frame, FIG. 20 shows a fragmentary front elevation of the mounting of the cams for the cream ejector pads, FIGS. 21 and 22 show in front and side elevation respectively an end cover for the creamer barrel, FIG. 23 shows in end view the creamer barrel with end cover removed, and the cream pat ejector mechanism, FIGS. 24 and 25 show the cream pat slicer or cut-off plate in elevation and plan respectively, and FIGS. 26, 27 and 28 show in elevation the cream pat cut-off and deposition equipment during deposit; non-deposit; and lug clearance respectively.

DESCRIPTION OF PREFERRED EMBODIMENTS

The sequence of operations shown in FIGS. 1 – 4 is:
1. feeding a line of individual biscuit shells or pieces along a feed channel,
2. depositing a layer of cream on the second of each successive pair of pieces,
3. displacing the first of each said successive pair of pieces backwards so as to be in tandem; that is, end to end; contact with the second of the pair and to be pushed along thereby,
4. turning the first piece of each said successive pair over backwards on top of the creamed biscuit piece,
5. correctly positioning the top biscuit piece of each pair on the bottom creamed piece, and
6. applying sufficient pressure to each sandwich to compact the sandwich, The cream filling used in the biscuit can be of variable stiffness.

The cream filling is to be extruded under continuous pressure onto the biscuit piece, and the size and thickness can be controlled.

It is difficult to apply cream layers of the required size and in correct position by intermittent ribbon extrusion on to successive spaced pieces during relative movement between pieces and creaming device, due particularly to the difficulty of precise control of the ends of the ribbon, although it is an ideal technique for a continuous process on other types of machines. In a known machine, an extruded ribbon has been cut into pieces of the required size and then automanipulated onto biscuit pieces.

A ribbon extruder as shown in FIG. 2 and described below, is capable of laying precise lengths of cream filling with sharp leading and trailing edges onto spaced biscuits travelling thereunder, contact between biscuit and extruder funnel being avoided. Referring now to FIG. 1, a belt conveyor 24 from a biscuit baking plant feeds individual biscuit pieces into a feed magazine 15 adapted to receive a stack of biscuits and to allow the stack to drop, step, by step as successive biscuits are removed from the bottom of the stack, as described below, onto a stationary biscuit runway or conveyor surface 13 of channel cross-section which thereby has sides to guide the biscuits along the conveyor surface.

The conveyor surface 13 is longitudinally slotted to permit vertical fingers 26 to move therealong through the slots. Fingers 26 are carried by an endless conveyor chain 8 mounted below the conveyor surface 13 and circulating clockwise as viewed in FIG. 1. The chain is mounted on sprockets 16 driven from a variable-speed electric motor 17.

The base of the rear side of magazine 15 is slotted or cut away to allow fingers 26 to pass therethrough. The base of the front side of the magazine is cut away over its full width to allow individual biscuits to move out of the magazine onto conveyor surface 13, as indicated in FIG. 1, under the influence of successive fingers 26. Fingers 26 are so spaced that the biscuits themselves are spaced from each other by a distance equal to about their own length in the direction of travel.

The biscuits pass under the extruder 1 which is timed to coat each alternate biscuit - i.e. the second biscuit of each pair. The operation of the extruder will be described later with reference to FIG. 2.

The next three operations each contribute to the placing of the first biscuit of each successive pair on top of the cream layer on the respective second biscuit. The overall technique is to shift the 'first' uncreamed biscuit relatively backwards so that it is in tandem, i.e. end to end, contact with the 'second' creamed biscuit, and then to use the contacting edge of the second biscuit as a pivot to turn the first biscuit over backwards on the second biscuit. Because this turn-over is not a precise operation, a position-correcting operation completes the sequence.

The first operation is carried out by a biscuit-retarding rail or retarder 9 let into the conveyor surface 13. Rail 9 laterally pivoted at its trailing end 27, considering the direction of travel of the biscuits, and is raised and lowered through an angle of about 20°.

The longitudinal slot for the fingers 26 must continue throughout the length of the conveyor surface 13 so that the rail 9 must be in two separately-pivoted spaced halves.

The rail 9 is operated from a rotary cam 28. Cam 28 and a shaft 29 carrying cream-extruder operating cams 14 are chain-driven from the conveyor chain drive sprockets 16 in desired timing relation. Cam 28 has a vertical cam-follower 10 adapted to raise and lower rail 9.

Rail 9 begins to rise just after each coated biscuit leaves it, and while the succeeding uncoated biscuit is on it. The rail rises above the conveyor finger 26 which is pushing an uncoated biscuit along the channel 13 so that the biscuit remains stationary on rail 9 until the finger 26 in question has passed on, at which time rail 9 is lowered to receive the succeeding coated biscuit being moved along the channel. This second coated biscuit of the pair will contact the rear of the stationary uncoated first biscuit of the pair, and will push it along in front thereof.

The pair of biscuits is now in position for the second operation, i.e. the formation of the sandwich at the next station, the equipment for which consists simply of a gallows 2 from which depends a freely pivoted finger 30 consisting of a rectangular frame of about the width of a biscuit. The bottom side of the frame is of substantial width and faces in the direction towards the oncoming biscuit pairs. The front of the uncoated biscuit of each pair will overrun the bottom edge of the finger, see FIG. 3. The finger 30 is sufficiently heavy to force the biscuit front edge to run up the finger as shown at in FIG. 4 until it reaches a stop 30a, after which the finger is forced to pivot backwards and swing in the direction of conveyor movement. See FIG. 5.

The relation between the lengths of the finger 30 and the biscuit is such that the biscuit is pivotally raised about its trailing edge in contact with the coated biscuit of the pair; is carried over dead center by the finger 30 as seen in FIG. 5; and is dropped, as seen in FIG. 6, onto the coated biscuit. After the sandwich moves from under the finger, finger 30 now returns to the position illustrated in FIG. 3 in readiness to receive the next biscuit.

There is now a loose sandwich moving along the conveyor surface 13 in front of a finger 26 to the next station, where the third operation is performed by a position-correcting device formed by arm 11.

The leading edge of the upper biscuit of the sandwich contacts the pivoted arm 11 which will resist its forward movement sufficiently to square it up and move it longitudinally if required, so that it is close against its pusher finger 26, after which the arm 11 is pivotally moved out of the path of the sandwich which continues its forward movement as a whole.

The next position comprises a tunnel 23 the bottom of which is the conveyor surface 13 and the cross-section of which is substantially that of a finished sandwich biscuit. The entry end of the tunnel is a little higher than the entering sandwiches and leads to a section, the roof of which consists of a sandwich pressure bar 12, the incoming end of which is downwardly chamfered, so as gradually to press the top biscuit of an entering sandwich onto the cream layer before reaching the main portion of the bar 12, which is at least as long as a sandwich. The height of the tunnel below bar 12 defines the correct height for a sandwich so that each sandwich leaves the tunnel correctly shaped.

The sandwiches are now delivered onto a cooler conveyor 25.

Manually-controlled clutches are incorporated into the drives for the cams 28, 14.

Pre-stacked biscuits are fed direct from feed conveyor 24 into magazine 15 where a single biscuit is extracted by each of the carrier fingers 26 on chain 8. Travelling along conveyor surface 13, the biscuits pass under the extruder 1 where every alternate biscuit has cream spread on to it. Each un-creamed biscuit is then lifted over its own carrier finger 26 by retarding rail 9 and placed immediately in front of the following creamed biscuit. Both biscuits, now pushed by the same finger 26 move down incline 22 in the conveyor surface to sandwiching finger 30 where the leading un-creamed biscuit of each pair is flipped over onto the creamed biscuit thus creating a sandwich. The sandwich then passes under aligner formed by arm 11 which pushes both biscuits back against the face of the carrier finger 26. The straightend sandwich then passes under pressure bar 12 which assures uniform thickness of sandwich, and travels on up the incline of tunnel 23, pushing preceding sandwiches in front of it, until the incline removes the sandwich from the control of the carrier finger 26. The sandwiches are pushed, one by one, onto cooler conveyor. It will be seen that handling of the biscuits is completely eliminated in this process, and the speed of operation can be geared to the rate of output of the baking plant. The new method of depositing the filling assures accurate weight, and uniform finish and appearance to the sandwiches.

The complete cream or filling handling equipment is shown schematically in FIG.1.

The cream is contained in a reservoir 19 having a stirrer 20 for maintaining the cream therein at the required consistency. An electro-mechanical power drive for the stirrer is indicated at 21. The conical base of reservoir 19 terminates in a connection to a cream feed pipe 6 feeding the cream extruder 1 via a cream infeed manifold tube 4 and a cream pressure balance valve 3. Flow through pipe 6 is maintained by a positive displacement pump 18.

Two or more extruders may be fed from tube 4.

An overflow pipe 31 leads from manifold extruder 1 via a cream re-circulate manifold tube 5 to a cream return pipe 7 entering the reservoir 19.

The principle of operation is that there is a constant flow of cream through a valve chamber in the extruder 1 while the equipment is in operation, the cream being directed alternately towards the extrusion nozzle 32 and towards the overflow pipe 31, so that the pre-set cream pressure remains constant.

Referring now to FIG. 2, the extruder 1 comprises a valve chamber 33 fed with cream via inlet 34 and having upper and lower outlet ports 35, 36 leading to the recirculation tube 5 and the extrusion nozzle 32 respectively. The casing 58 of the extruder is slotted top and bottom to provide slide-ways for recirculating slide valve 39 and deposit slide valve 40 which control the upper and lower valve chamber ports 35, 36 respectively by the slide valve ports 37, 38.

The slide valves 39, 40 are carried by the T-shaped support 41 so as to be slidable simultaneously, whereby valve ports 37, 38 alternately open casing ports 35, 36. Thus one casing port is always open to allow for continuous flow of cream through the valve chamber 33, and a constant cream pressure.

The valve support 41 carries a cam-follower roller 42 on needle bearings, which cooperates with complementary wedge-shaped cams 43 tangentially mounted on the peripheral side portions of cam discs 44 carried by shaft 29, FIG. 1A. Shaft 29 is rotated via clutch means (not shown) from a sprocket wheel rotatably mounted on the shaft and chain-driven from the shaft of cam 28. The cams 43 are peripherally spaced so as to act on roller 42 alternatively. Thus, as cams 43 pass roller 42 in turn they guide the roller first to the left and then to the right. Thereby, the slide valves 39, 40 are operated to change over the opening of the ports 35, 36 in a sequence such as to pass cream through nozzle 32 during the passage thereunder of alternate biscuit layers, and to recirculate the cream in the intervening periods.

A side port 45 communicating with the throat 46 of the nozzle 32, contains a piston 47. A support 48 for piston 47 is movable horizontally under control of a pair of wedge-cams 49 on discs 50, similar to cams 43 on discs 44, and likewise carried by spindle 29 for rotation therewith to operate the piston 47.

The piston 47 and port 45 act as a vacuum pump in relation to the nozzle throat 46. The timing of the piston movement is arranged so that the piston is withdrawn to the right, FIG. 2, just after the port 36 is closed, thus creating suction within the nozzle throat 46 at the termination of an extrusion stroke thereby withdrawing cream in the nozzle and creating a sharp cut-off of the deposit on the biscuit. The piston is returned to the left, just as port 36 is opened, to assist in a quick flow of cream through the nozzle 32.

Thus, re-circulation or feed-back of the cream maintains a constant flow of cream at constant pressure, ready to force cream through the nozzle; and prevents inertia slowing down extrusion cut-off, as occurs in conventional extrusion devices due to the need to stop the flow of cream entirely. At the same time the suction and pumping effects of piston 47 at the termination and commencement of an extrusion operation greatly assist in ensuring that the length of the cream ribbon extruded onto alternate biscuits is constant and precise.

In order to assist in sealing the port 45 against outward leakage of cream and inward leakage of air during operation, plunger washer is fixed to the front end of piston 47, consisting of two frusto-conical neoprene rubber caps mounted back to back on the end of the piston so that their oppositely-facing outer edges respectively act as seals for movement in opposite directions.

Thus, ribbons of cream are extruded onto alternate biscuits, and in the intervals between the extrusion operations, the cream, which is being continuously pumped to the extruder, is fed back to the reservoir 19.

The modifications shown in FIGS. 7–28 relate to the introduction of biscuit pieces into the sandwiching machine; to the cream deposition equipment; and to the provision of a large number of closely spaced parallel sandwiching channels for handling the output from a multi-channel tunnel backing oven, seventeen channels being provided in a particular application.

In the original system, the supply of pieces came from a tower stack, the successive bottom pieces being swept horizontally onto the sandwiching machine conveyor by a succession of upstanding pusher fingers on the horizontal conveyor run.

The machine is now arranged to receive a continuous flow of biscuit pieces direct from the oven and a continuous transfer technique has been evolved.

Since the biscuit feed is continuously running, it must be as free as possible from breakage, or jamming will occur.

Carrier finger feed from a magazine has proved impracticable with biscuits of extra-brittle or soft material, since the loading of biscuits one on top of the other imposes extra strain on the bottom biscuit, causing too high an incidence of breakage. In fact, resistance to extraction on the bottom biscuit was often such, that the carrier fingers travelling sometimes sheared completely through a biscuit.

It has been found possible to feed the biscuits lying flat, one behind the other, with the biscuit face facing upwards, but the angle at which biscuits contact the supporting surface of the conveyor is extremely critical, and the biscuits tend to overlap at the feed-in point.

These two factors have been provided for by fitting a short conveyor belt 105, FIGS. 11–16 above and preceding the machine feed-in section, which belt imparts a sufficient uniform velocity to biscuits at the point of drop-off. A sloping array of rods 106 fitted across the machine controls the inclination of drop, and the machine conveyor surfaces 102 are milled or otherwise roughened at this point, as indicated at 104, to control biscuit slippage. Sweep-back plates 103 prevent 'double-feed' as described below.

The biscuit pieces in seventeen parallel files from the oven conveyor are passed to an intermediate conveyor belt travelling at a speed equal to the maximum output speed of the oven, so that the delivery of the pieces from the intermediate conveyor 105 to the sandwich machine will be at variable spacing.

The conveyor 102, FIGS. 7–12 of the sandwich machine, which is at a lower level than the intermediate conveyor 105 comprises as described above, a longitudinally slotted static support or conveyor surface on which the pieces glide. The conveyor surface is above an endless conveyor chain carrying spaced fingers 101 which extend upwards through the slot and carry along the biscuit pieces in front of them.

The incoming end of the conveyor chain assembly is spaced from the incoming end of the slotted support so that there is a short length of support before the point at which the fingers on the chain rise into the slot. Side brackets enclose said initial short length of slotted support and carry lateral horizontal rods 106 arranged to form a guide for the biscuit pieces dropping off the intermediate conveyor 105 to cause their leading edges to impinge on the slotted support in a manner designed to avoid breakage.

The slotted support 102 is polished to facilitate movement of the pieces thereon, but the part 104 on which the biscuit pieces land is milled or otherwise roughened so that the pieces come to a stop in a predetermined position in readiness to be picked-up by the conveyor fingers 101 as they rise in the slot of the support.

If two or more pieces reach the outgoing end of the intermediate conveyor in quick succession and drop one after the other before the first one is carried along the conveyor, the arrangement is such that the leading parts of the later pieces will each rest on the trailing edge of the preceding piece, successive pieces being dropped into the 'pick-up' position as the preceding piece is taken away by a conveyor lug. Thus, there is provision for buffer storage of a minor character to cater for variations in delivery rate from the oven as explained below in connection with FIGS. 7-16.

The only timing requirement for biscuit feed is that the speed of the machine chains, (number of carrier fingers per minute) should be at least the same as speed of the biscuit cutting machine (number of biscuits per minute) between the oven and the sandwiching machine, but the chain speed may exceed this without any undue trouble arising.

The angle of presentation of the biscuits to the conveyor is important to prevent blockage and to facilitate feed onto the conveyor in single file, with the biscuits trailing the 'lead' biscuit falling into a smooth pattern of presentation to the conveyor in overlapping relation for individual pick-up one by one by the carrier fingers. This gives continuity of feed and allows for natural timing adjustment of the biscuits to suit the carrier fingers. The relative position of an initial flow of biscuits to the machine is arbitrary with respect to the carrier fingers. Relative positions, as regards timing, may be considered as follows.

If a biscuit feeds on top of a finger, it must be manipulated so that it assumes a flat position on the conveyor behind the finger. For this reason a sweep-back member must be provided which must not foul the fingers 101. A suitable plate 103 to form the sweep-back member is shown in FIGS. 7-16.

The biscuits must be so presented to the fingers that they are picked up in front of the center of gravity as explained in FIGS. 7-10. If picked up behind the center of gravity as shown in FIG. 8, a biscuit will be carried forward under the plate 103 and will be clamped and broken. If picked up in front of the center of gravity as in FIG. 9, the leading edge of the biscuit will impinge on plate 103 which will sweep the biscuit back with respect to the finger 101 as the finger continues to move forwards.

FIG. 11 shows the relative positions of the outgoing end of the intermediate conveyor belt 105, the array of lateral guide rods 106, and the conveyor support 102, so arranged that a leading biscuit reaches the conveyor support 102 at the angle indicated in FIG. 9. If such a biscuit arrived on a polished surface its leading edge would slip forward and tend to present its rearwardly end to a finger (approaching in a suitable positional relation) and the situation shown in FIG. 8 would exist. However, the roughened area 104, FIG. 11, of the conveyor support onto which biscuits impinge is milled so that a biscuit edge will not slip thereon and will remain in position B1, FIG. 11 until picked up by the finger 101X. The leading biscuit would be swept back by plate 103 and would be fed forward by the next finger 101Y, the next biscuit B2 riding on B1 and 101Y (FIG. 12) and being in turn swept back to be picked up by the next finger, and so on.

FIG. 16 shows in broken lines the vector curves VL and VT of the leading and trailing edges respectively of a biscuit travelling by its own inertia and by gravity along the guide rods 106.

The two-dimensional positioning of the outgoing end of conveyor 105, the rods 106 and the roughened area 104 of conveyor support 102 with respect to one another is quite critical.

Figure 1A:
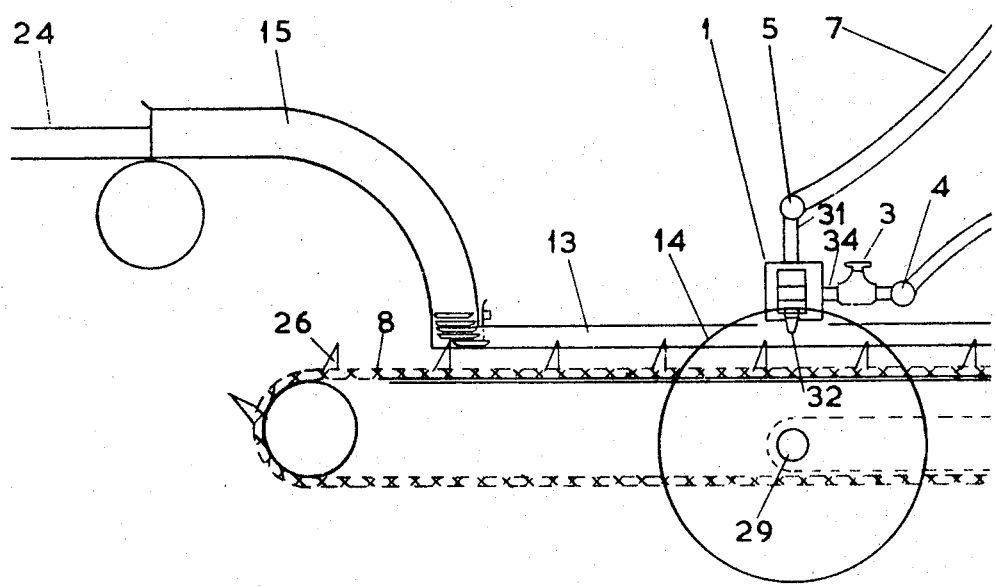
Figure 1B:
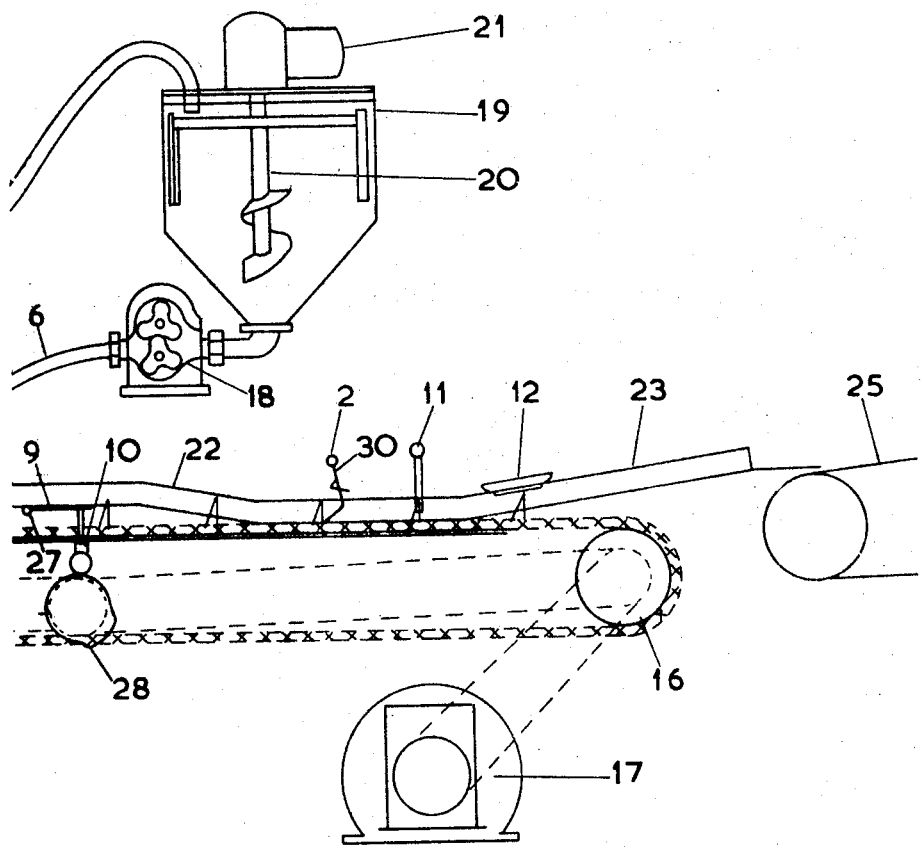
Figure 2:
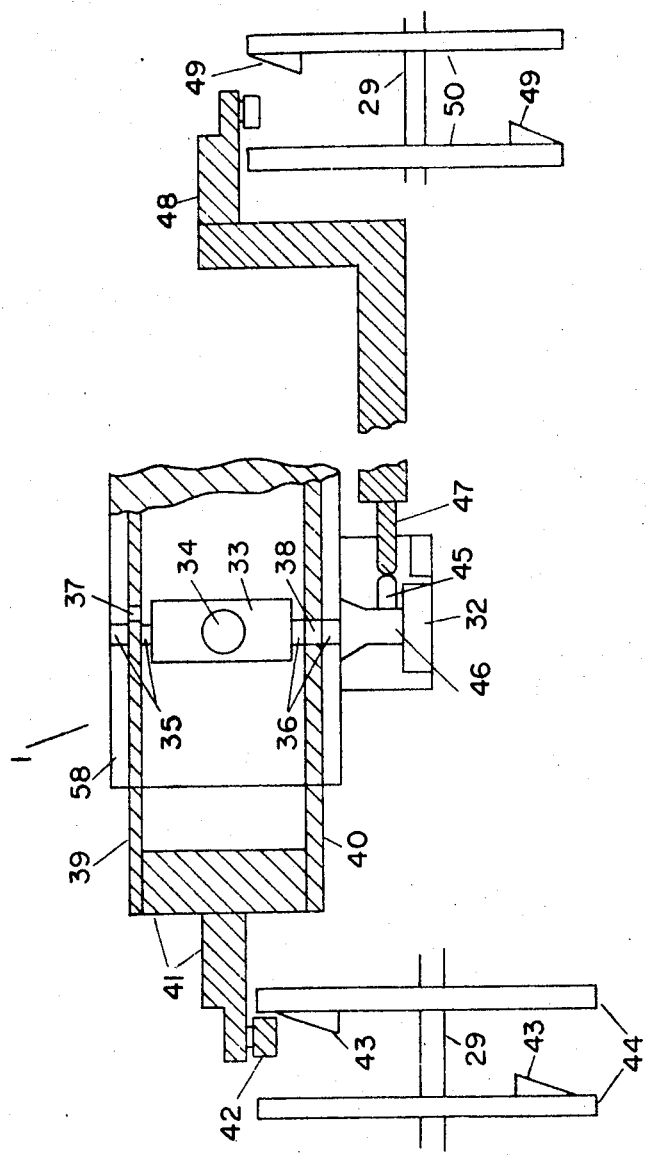
Figure 3:
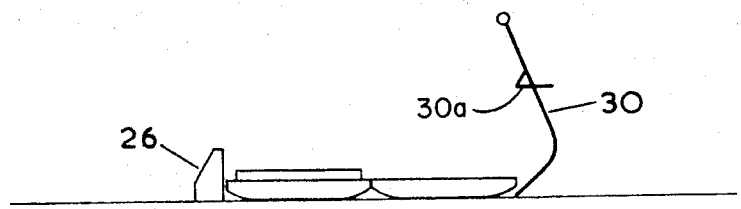
Figure 4:
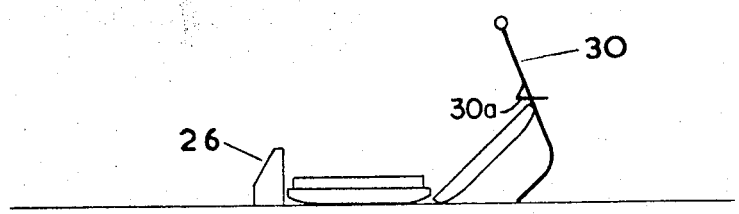
Figure 5:
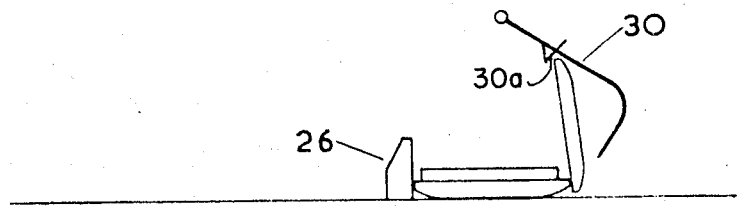
Figure 6:
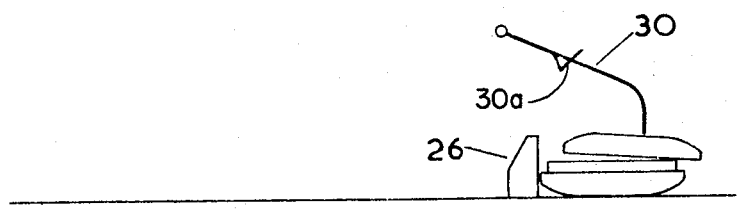
Figure 7:
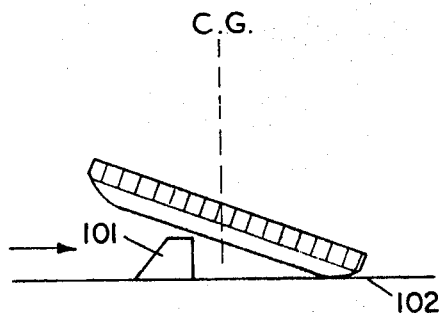
Figure 8:
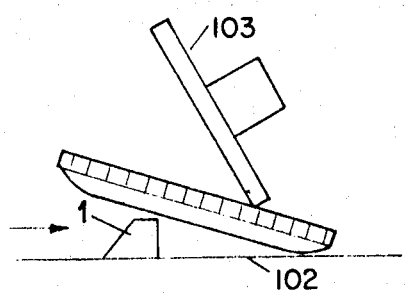
Figure 9:
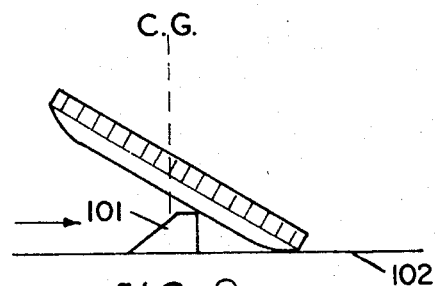
Figure 10:
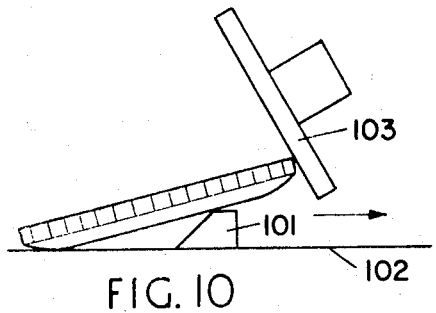
Figure 11:
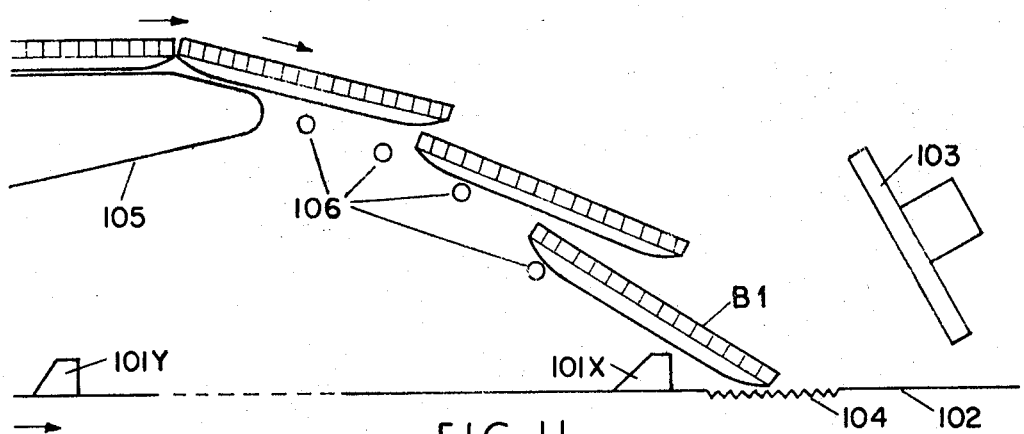
Figure 12:
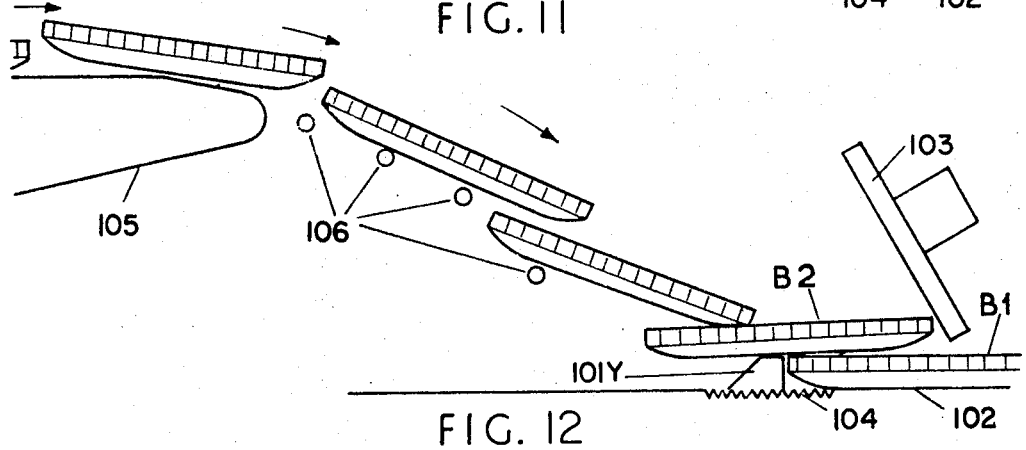
Figure 13:
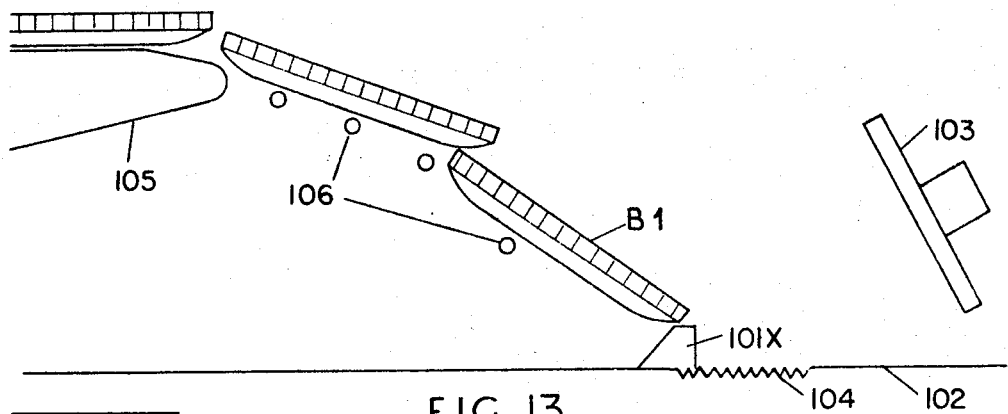
FIGS. 13-16 show another timing situation between incoming biscuits and the fingers which the leading edge of biscuit B1 impinges on the top of finger 101X so that 101X leaves B1 behind without the intervention of plate 103, and B1 is picked up by 101Y, and so on, 101Z for instance picking up B2.
Figure 14:
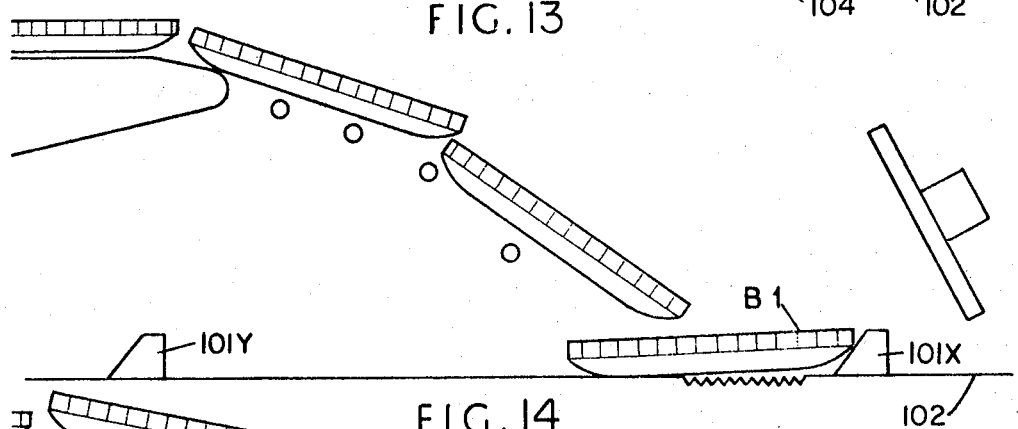
Figure 15:
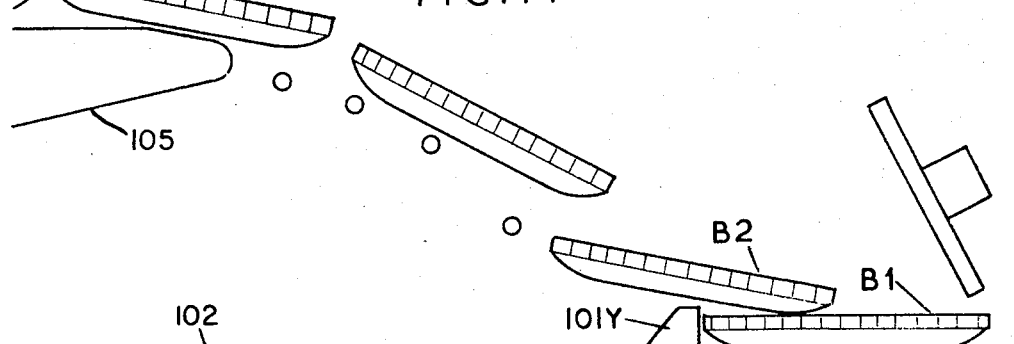
Figure 16:
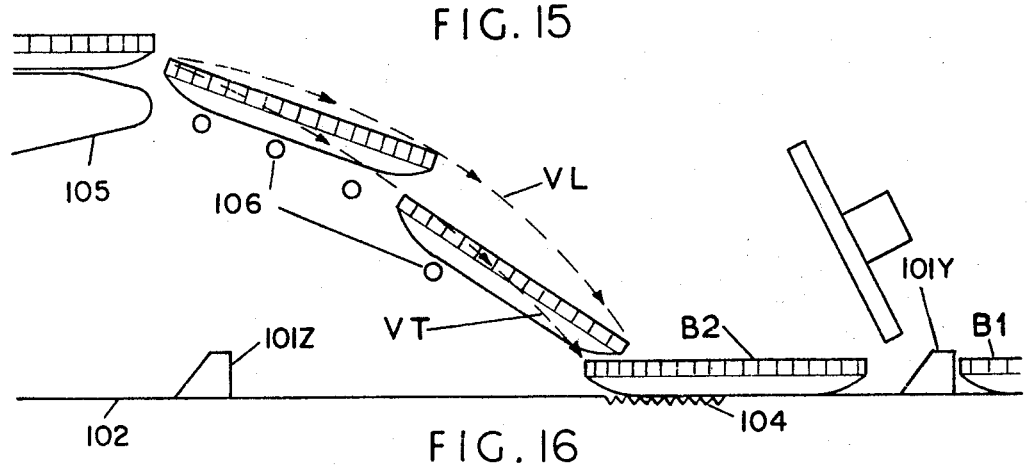
Figure 17:
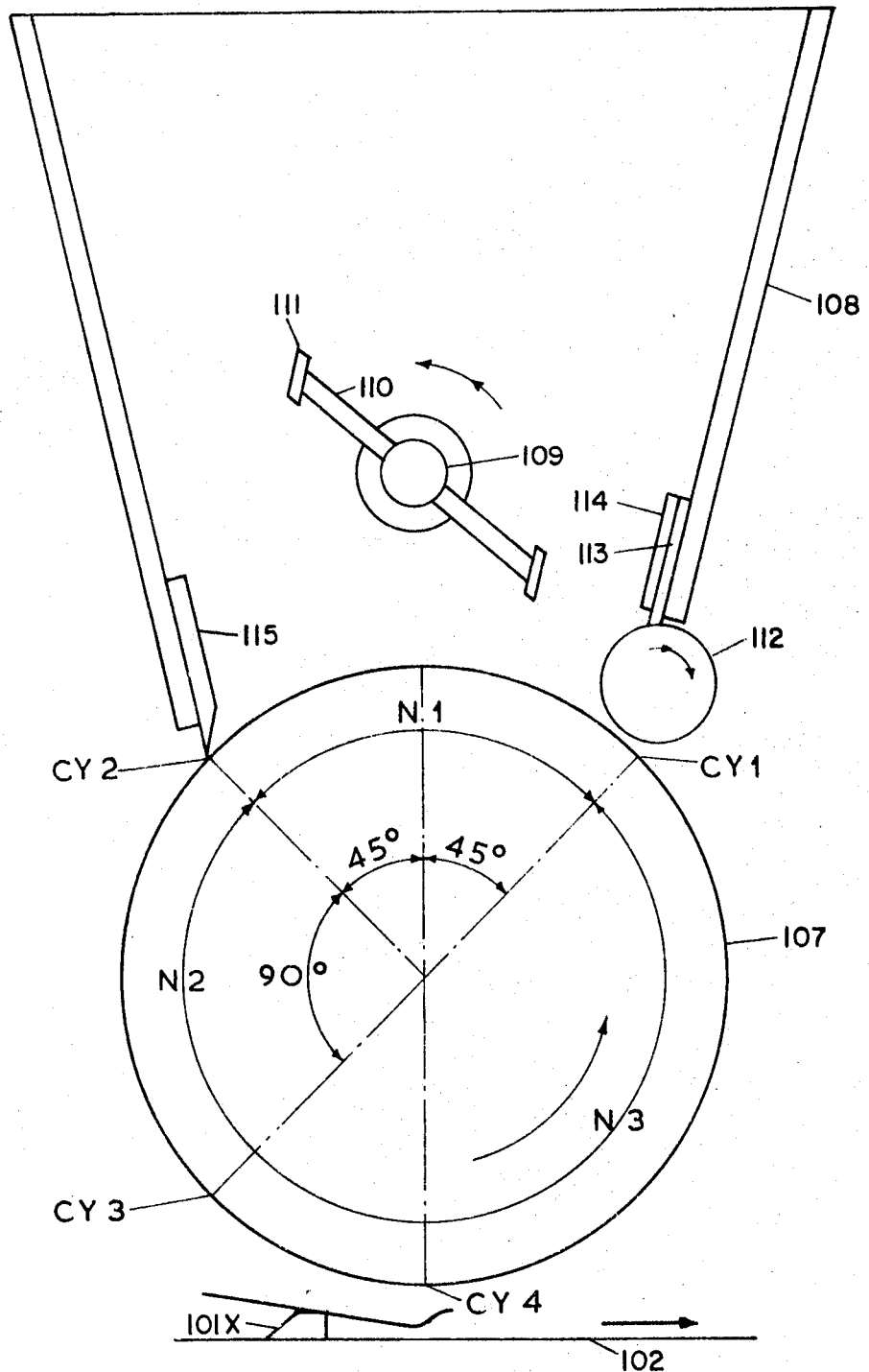

The cream deposition equipment essentially comprises a cream hopper 108, FIG. 17 of substantial depth, of the order of 25 cms., having its longitudinal sides converging to a rectangular bottom opening in which fits a top 90° segment of a horizontal, cylindrical, metal roller barrel 107 constituting part of a multiple cream mold.

The cream hopper 108 is a container of box-like structure, with open top manufactured mainly from Tufnol (trademark) plastic sheet. The hopper is mounted centrally on top of, and along and across the length of the roller 107. The ends of the hopper viewed from the end of the machine, are wide at the top and converge towards the bottom which is of concave shape and has arcuate contact bearing with the roller surface, which constitutes the base of the hopper.

The linear base of the hopper side from which the revolving roller surface emerges during rotation has fitted on the inside, a steel scraper 115 which contacts the roller surface. Between the base of the hopper side, into which the revolving roller surface enters, and the roller surface is a small cream reclamation roller 112 revolving in the opposite direction to the roller 107. Between the two roller surfaces there is a small clearance gap. A rubber strip or wiper 113 is clamped along the inside of the hopper base by bar 114, and the edge of this rubber strip contacts the top surface of the reclamation roller to act as a cream seal. Fitted through bearing holes in the hopper ends is a driven shaft 119 on which two steel cream agitator blades 111 revolve in the same direction as the roller 107. Blades 111 are affixed to shaft 109 by radial arms 110. The complete hopper assembly is carried by the support side plates.

The functions of the cream feed hopper are such that when cream is loaded into the hopper, the gravitational thrust of the cream mass, aided by the motion of the cream agitator and suction, causes the molds on the roller 107 to be filled with cream. The roller surface, on passing underneath the cream mold scraper 115, is scraped clean, and the surface of the molded cream is scraped level with the roller surface. If, on being ejected, the molded cream is not cut off, it is returned on the surface of the roller 107 to the hopper, where the impellent action between the surfaces of the roller 107 and the small cream reclamation roller 112 causes the cream to be drawn, or reclaimed, into the hopper. The cream seal 113 prevents cream from being carried out on the surface of the reclamation roller.

All drives on the roller 107 and the cream feed hopper are inter-connected.

The roller 107 is rotatably mounted on a horizontal shaft 119 geared to a motor drive (not shown). The thickness of the roller 107 constitutes the maximum possible thickness of the cream pats to be molded: and their shape is determined by the shape of apertures cut through the barrel. In the present case the apertures are rectangular, and seventeen spaced apertures are formed along a line across the barrel, with their longer sides parallel.

According to the timing cycle of operations of the machine, a plurality of lines of mold apertures can be cut across the roller; in this case, two diametrically opposite lines.

Figure 23:
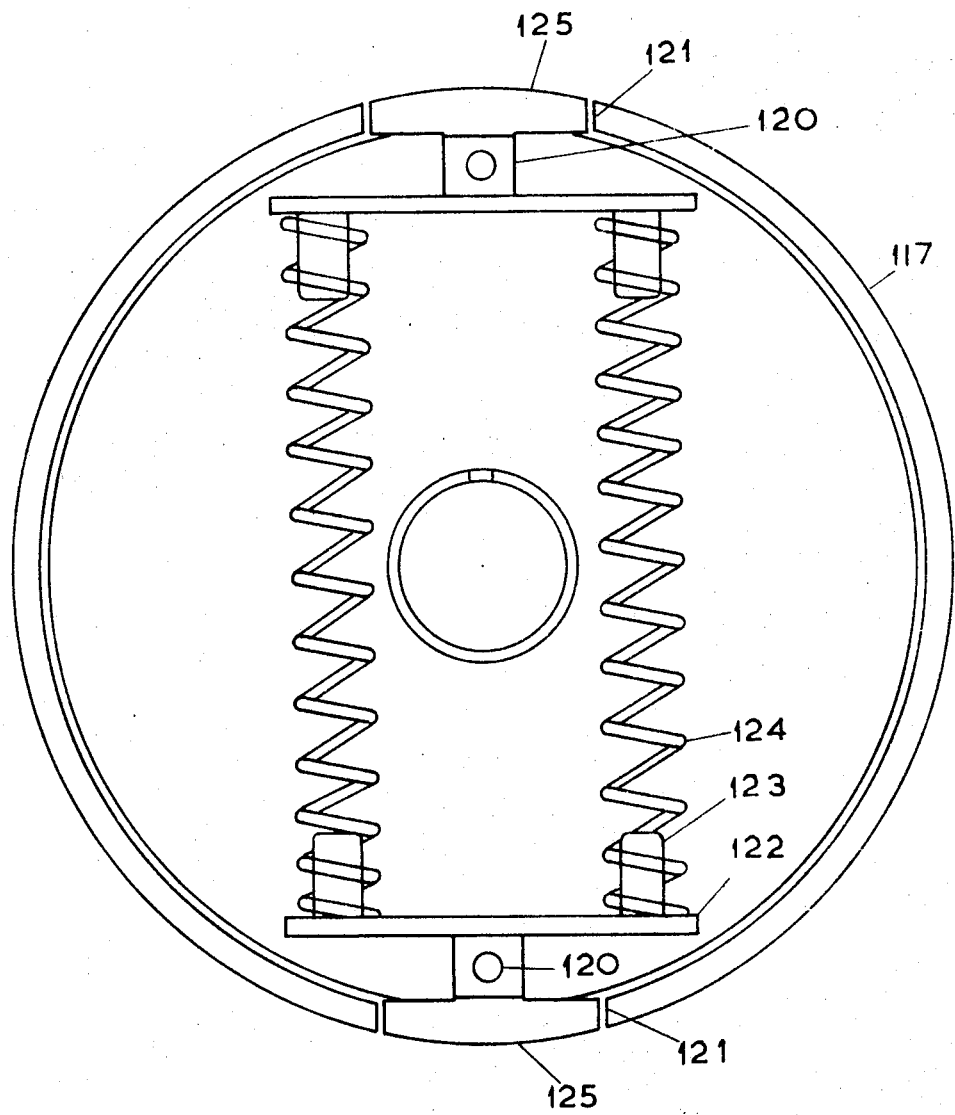

Within the roller, radially below each line of mold apertures, is on ejector supporting bar 120, FIG. 23 which is radially movable in supports carried by the cylinder so as to rotate therewith. The ends of the bar extend axially beyond the roller and carry cam-follower rollers 132 in operable relation with cams 130, FIG. 18 carried by the side support plates 126 for the barrel. The bars are urged radially outwardly by springs 124, FIG. 23 and their radial movements to and from the barrel are controlled by the cams so that the dies or ejection pads 125 on a bar fill the respective line of molds 121 as the molds enter underneath the hopper; are drawn inwardly as the molds pass under the hopper 108 so that the cream is sucked and forced into the molds. Thereafter the ejection pads are returned gradually outwardly into the molds in the next 90° of rotation after which the pats of cream on the surfaces of the dies are standing proud of the surface of the barrel in readiness to be detached and dropped when immediately above a biscuit piece. The cams are adjustable to vary the radial movement of the ejection pads and the consequent thickness of the pats as will now be described.

Biscuit weights and cream density vary from time to time according to environmental conditions. Therefore the volume of cream on a set area of deposit should be variable to compensate for the deviations. The method of forming deposit must be such, that relatively high speeds may be attained without affecting the smooth action of the mechanical and functional operations, and deposition should only take place when a biscuit is present to receive a deposited cream pat; no biscuit – no deposit.

The roller 107 is a hollow steel tube with two diametrically opposed rows of rectangular shaped ports defining the molds 121 machined through the tube wall at fixed pitches (biscuit row pitch) along the length of the tube.

Figure 21:
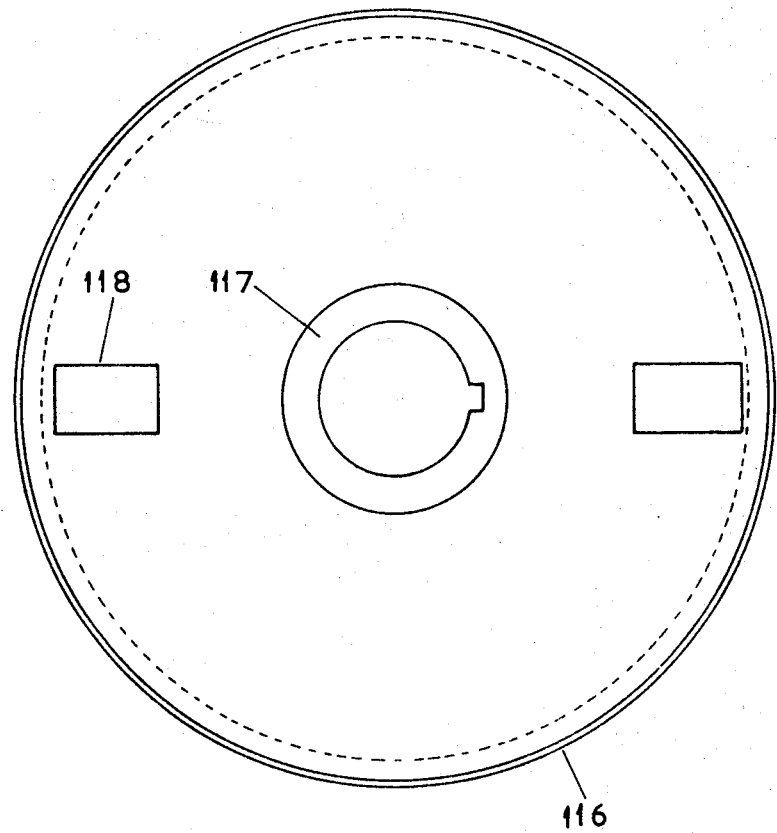
Figure 22:
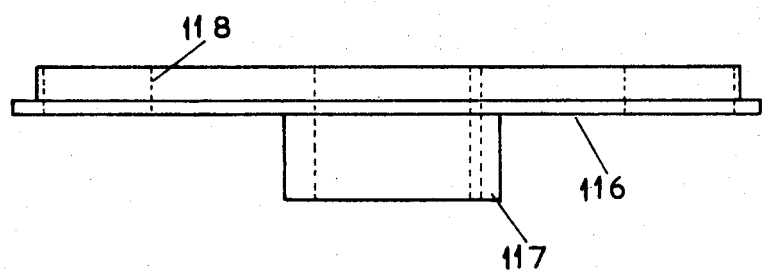

Steel end covers 116 (FIGS. 21-22) with bored and keywayed center bosses 117 are fixed to the tube ends. Two rectangular slots 118 diametrically opposed are machined on diametrical axes through each end cover, with the axes being in line with the rows of molds 121.

Shaft 119 (FIGS. 18-19) having an extended end for a drive wheel, is fitted through the end cover center bosses 117. Two square section ejector bars 120 are fitted respectively through the longitudinally aligned top and bottom pairs of slots 118, each bar being underneath and aligned with a respective row of molds 121. The bars 120 extend through the end cover slots 18 in a sliding fit. The ends of the bars are machined to a round section to receive small roller bearing cam followers 132 (see particularly FIG. 20). Flat bar supports 122 (FIG. 23), each with two locating studs 123, are welded at right angles to the portions of each bar 120, which portions are just inside the covers 116.

Four compression ejector springs 124 are fitted over respective opposed pairs of locating studs 123 imparting balanced outward thrust to the diametrically opposed bars 122 of the ejectors.

Ejector pads 125, formed of a plastic such as that sold under the trademark Tufnol, are fitted, with minimum slide clearance tolerances on all sides, into each of the molds 121 in the roller 107, and are fixed to the ejector bars 120. With the ejector bars in the maximum outward position which the end cover slots 118 will allow, the outer surfaces of the ejector pads 125 are machined to conform to the curve of the outer surface of the roller 107. This assembly constitutes the Mould/Ejection roller barrel.

The barrel is fitted across the machine at right angles to, and just above the biscuit guide rails.

The roller shaft 119 is mounted in self-aligning bearings which are fixed to supporting side plates 126.

The side plates are bolted, through slots 127, to the machine frame 128. Jack-screws 129 at the base of the side plates, permit height adjustment of the side plates and barrel.

Adjustable cams 130 are fitted by means of pivot pins 131 to the inner faces of the side plates. The proper positioning of the cams for activation of the mold/ejector mechanism is made by adjustment of screws 155A. The ends of the ejector bars 120 carry cam-follower rollers 132 which follow in turn the internal contours of the cams 130. When radially inward thrust is applied to its cam-followers 132 by means of the cams 130, and ejector bar 120 is pushed radially inwards in its slots 118 in the end covers 116 and the ejector pads 125 are retracted below the surface of the roller 107, creating rectangular cavities or cream molds. The depth of the molds may be varied according to the radial movement applied to the cam followers 132, the cams 130 being adjustable around their pivots 131 for that purpose. Cream can now be entered into the mold cavities by pressure and suction, and scraped level with the roller surface as the cavities pass under the scraper blade 115.

Referring to FIG. 17 retraction begins as a row of cavities and its pad carrying bar 120 pass point CY1, in the counter clockwise direction, and is complete before the cavities reach CY2, at which point the cam terminates, FIG. 18, and the outward thrust of the ejector springs 124 begins to take effect. Thus, during the half-revolution revolution N3, FIG. 17, the ejector mechanism rotates freely with the ejector pads 125 fully extended; during the quarter revolution N1, the pads are gradually retracted under control of the cams 130, FIG. 18 ; and during the quarter revolution N2, springs 124, FIG. 23 are allowed to move the pads gradually outwards under control of the cams.

The outward thrust of the ejector springs causes the ejector pads to return to the surface level of the roller, thus ejecting molded rectangular formations or pats of cream onto what is virtually the outer surface of the roller 107. The cream pats are now ready for deposition on biscuits. This action may be achieved only by cutting by, say, a wire, since the cream is a semi-solid of a highly viscous nature and adhesion will normally cuase it to remain on the roller 107.

Figure 25:
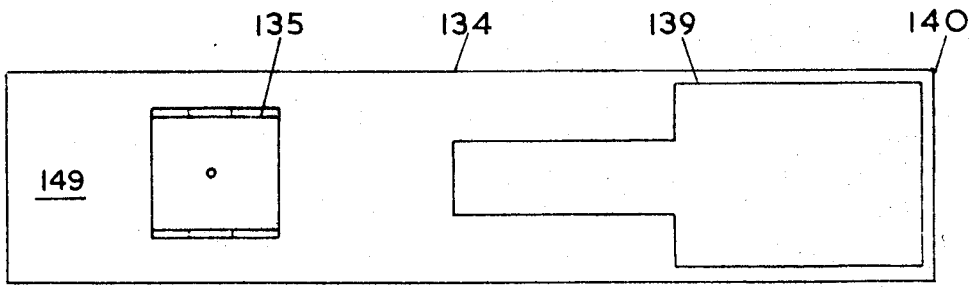
Figure 26:
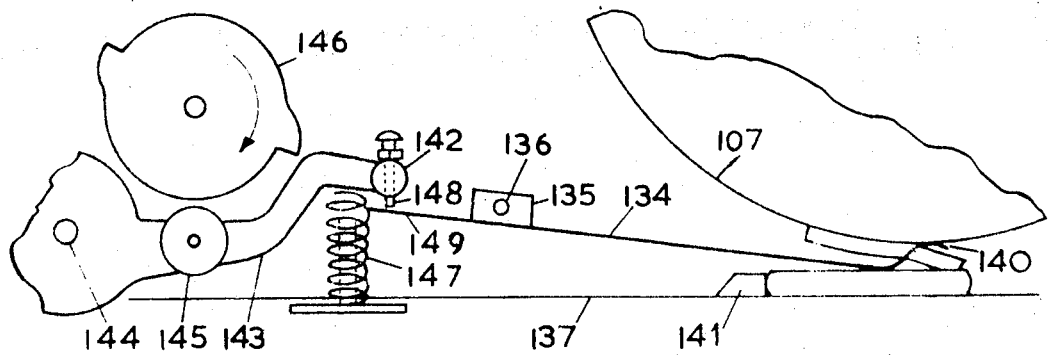

Across the top of the conveyor preceding the pat-depositing point are pivot rods 144, FIG. 26, on which are freely pivoted one slicer or cut-off plate 134 for each conveyor. Each slicer has a tail 149 extending backwards in relation to the conveyor movement. Each slicer is operated by a respective cam 146 on a lateral cam-shaft suitably positioned relative to said pivot rods 144. The slicer itself, extending from spindle 136 forwardly in the direction of movement of the conveyor, is a rectangular frame 139, FIG. 25, the sides of which span the conveyor slot and the front cross-piece 140 forms a cutter. This cutter is in the form of a thin blade or wire with a sharpened inner edge set so that when the slicer is pivoted counterclockwise about spindle 136 the blade contacts the roller surface at a slight angle to the tangent. The slicers are biased by springs 147 towards the slotted conveyor support 137, FIG. 26.

As stated, selective cream deposition is founded on the concept that cream should not be deposited unless there is a biscuit present to receive the deposit. A cut-off plate has therefore been designed in such a manner that the moving biscuit itself imparts motion to the plate to cause deposition to be effected. Each separate biscuit row is fitted with an individual cut-off plate.

Figure 24:
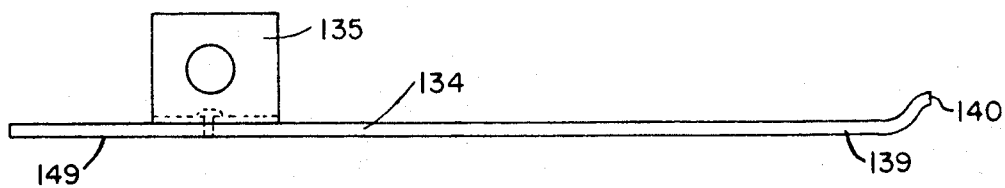
Figure 27:
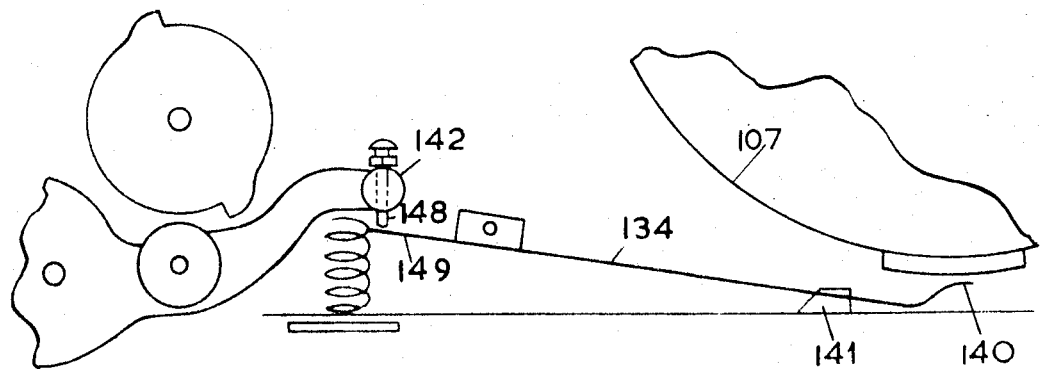

The plate 134, FIGS. 24-25, is manufactured from spring steel strip and carries a U-shaped bracket 135 pivoteally mounted on a spindle 136, above the conveyor supporting surface 137. The conveyor supporting surface is carried by adjustable supports 138 on the side plates 126, FIGS. 18-19. Each plate has an aperture adjacent its distal end (FIG. 25) to provide what is virtually a short toughened wire 40. The shape and setting of the plate is such that this wire extends laterally underneath and slightly behind bottom dead center of the mold/ejection roller 107, and normally lies above the support surface 137 at a height less than the thickness of a biscuit. In that position a cream pat may pass above the wire without contacting it, creating the action of non-deposit (FIG. 27). When a biscuit passes underneath the plate, it causes the wire to be lifted up to a position of contact with the surface of roller 107 (FIG. 26), thereby effecting separation of the cream from the barrel. The relative heights of biscuit and roller, at this point, are such that contact and adhesion of cream on biscuit are attained.

Since the wire end 140 of the plate 134 normally lies below the top of the biscuit, the biscuit carrier fingers 141 would foul the wire in this position. Therefore, the wire must be lifted just before the carrier finger reaches it, and dropped immediately after the carrier finger has passed by underneath.

Pivot rods 144 are on each side of the machine near the biscuit feed and carry pivotal arms 143 between the ends of which is carried a transverse bar 142. Bar 142 carries apaced operating pins 148, one above the tail 149 of each plate 134 opposite to the wire end 140.

The arms 143 carry cam follower rollers 145 operable by cams 146 to oscillate the arms about their pivots 144 against springs 47.

Figure 28:
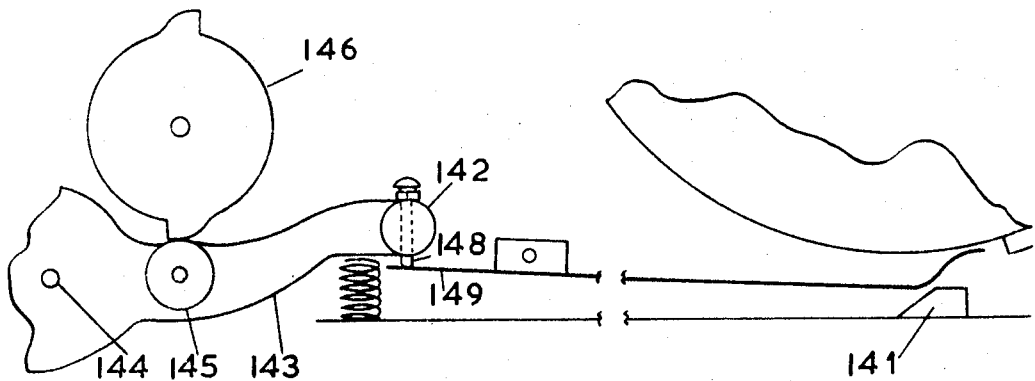

In turn the arms depress tails 149 to move plates 134 about their pivots 136 to the FIG. 28 position. When the cam 146 releases arms 143, the plates 134 return to the FIG. 27 position by gravity. The wire ends 140 of the plates 134 then drop down behind the carrier fingers 141 to rest on the conveyor support 137.

Recapitulating, each biscuit piece passing along the conveyor first contacts the side-pieces of the frame 139 of slicer 134, raises the slicer about its pivot 136, and passes thereunder, the slicer meanwhile being in contact with the mold roller surface. For the first piece of each successive pair, the slicer is operated idly, but for each second piece, the slicer encounters a pat of cream and cuts it away from its ejector pad surface so that it drops on to the biscuit piece.

If a 'piece' position on the conveyor is empty, the slicer will not be raised, and if that position is a 'second piece' position, the cream pat offered for deposit thereat is left adhering to its extrusion pad.

As stated, fingers on the conveyor chain positively push the biscuit pieces along the stationary slotted conveyor support, and the fingers extend substantially above the support for this purpose. In order to ensure that the fingers do not foul the cutting edges of the slicers, the cams 146 depress the tails 149 of the slicers, and raise the respective cutter 140 while each finger 141 passes the cutter position.

By suitable re-design, the slicer cutters can be positioned normally above the fingers so that the slicer tails and the cam shaft will not be required. Alternatively, if a belt conveyor for the biscuit pieces is used, relying on friction for conveying the pieces, the need for the slicer tails and the cam shaft is avoided.

In order to clean unused cream pats from the ejector pads a small positively-driven roller 112 is mounted in the leading edge of the cream hopper base parallel with and slightly spaced from the barrel surface entering below the hopper edge. The roller 112 rotates in the opposite direction to the roller 107 so that the roller and barrel together act like the rolls of a metal sheet-rolling plant and inject any cream pat on the barrel surface reaching the roller 12 into the hopper in a thin stream so that it is mixed into the hopper contents and the barrel surface is wiped clean. The operation conserves cream; prevents mess on the machine; and assists in maintaining a uniform cream texture in the hopper.

The embodiments of the invention in which are exclusive property or privilege is claimed are defined as follows:

1. A biscuit sandwich making machine for making sandwiches from a plurality of biscuit pieces, said machine comprising:
    a generally horizontal static conveyor surface with a longitudinal slot therein;
    an endless conveyor having a run thereof below said surface, said conveyor having spaced pusher fingers upstanding through said longitudinal slot, said endless conveyor moving said fingers along a path in a given direction with respect to said static surface;
    means at a first position along said path to deliver biscuit pieces to said path so that said fingers push biscuit pieces along said path;

filling depositing means at a second position along said path in said direction from said first position for coating biscuit pieces which are in front of alternate pusher fingers; and an inverter device positioned at a third position along said path in said direction from the second position for inverting the alternate uncoated biscuit pieces onto the coated pieces, said inverter device comprising a finger pivotally mounted above said conveyor surface and extending downwardly from said mounting with its lower end in said path, said pivotal mounting defining a pivotal axis lying in a plane normal to said path, said lower end having a lip which extends in the opposite of said direction so that the front end of each uncoated biscuit piece rides onto said lip and is raised by said inverter device as the movement of the biscuit piece in said direction swings the finger in said direction and said front end moves upwards until the biscuit piece passes the upright position whereupon the uncoated biscuit piece drops backwards above the succeeding coated biscuit piece in position to be engaged by the pusher finger in engagement with the succeeding coated biscuit piece so as to be pushed forward therewith in the process of forming the sandwich.

2. A machine as set forth in claim 1, wherein the first mentioned means delivers one and only one biscuit piece in front of each pusher finger, said machine including means positioned between said second and third positions for raising only the uncoated biscuit pieces above the tops of their respective pusher fingers and depositing them back on the surface behind their respective pusher fingers and thus in front, respectively, of each succeeding coated biscuit piece so that the latter makes contact with the rear edge of the deposited uncoated biscuit piece and pushes the uncoated biscuit piece in front of it until the front edge of the uncoated biscuit piece rides onto the lip of the inverter device and is thereby inverted onto the coated biscuit piece that pushed the uncoated biscuit piece onto the inverter device.

3. A machine as set forth in claim 2 including means along said path in said direction from the third position for positioning the uncoated biscuit piece correctly on the coated biscuit piece and for compacting the uncoated biscuit piece in its correct position on the filling layer on the coated biscuit piece.

* * * * *